Oct. 9, 1928.

R. J. POMEROY 1,686,987

METHOD OF MAKING COMPOSITE PICTURES

Filed Feb. 7, 1927

Inventor
Roy J. Pomeroy

Attorney.

Patented Oct. 9, 1928.

1,686,937

UNITED STATES PATENT OFFICE.

ROY J. POMEROY, OF LOS ANGELES, CALIFORNIA, ASSIGNOR OF ONE-HALF TO FAMOUS PLAYERS-LASKY CORPORATION, OF LOS ANGELES, CALIFORNIA, A CORPORATION OF NEW YORK.

METHOD OF MAKING COMPOSITE PICTURES.

Application filed February 7, 1927. Serial No. 166,303.

This invention has to do with the making of composite photographs, photographs that embody two or more components which were not originally associated when first photographed. The desirability of making composite photographs is particularly marked in the motion picture art and, although the invention is not limited to that art, I shall therefore explain my methods particularly with motion picture work in view. And in motion picture work, although any two original scenes or components may be composed into a single photograph, the most common operation involves the composition of a selected background with selected action.

The invention to be described hereinafter bears certain broad similarities to methods explained in my co-pending applications. In my application, Serial Number 76,423, filed December 19, 1925, entitled Photographic method, I described a procedure which utilizes what for brevity I term a blue transparency—a transparent positive that is substantially uniformly transparent to blue light, but upon being illuminated with red light, then shows up substantially as a black and white positive. Using such a blue transparency (it will be understood that the selected color is arbitrary and not a limitation upon the invention) I explain in said application how, by illuminating the image on that transparency with light of a relatively minus blue color and illuminating the other component (in this specific case the action) with blue light, and causing the action component to intercept the light of the blue transparency so as to mask out a corresponding portion of the background image, I am enabled to expose a fresh film to the two components and obtain thereon the composite photograph. The general idea underlying the method of the prior application is in the use of two mutually exclusive colors—colors having a minus relation to each other; in the relative arrangement of the two components (whether those components be real or photographic images or the like) so that one component intercepts or masks out a part of the other; and in the selective exposure of different parts of the fresh actinic surface to the different colored lights transmitted from the two components.

That same general idea underlies the method to be described in this present application, also the methods described and claimed in two other companion applications filed on even date herewith and each entitled Method of making composite pictures, bearing Serial Numbers 166,301 and 166,302. However, as has been noted in said companion applications, and will be noted herein, the use of what I term the blue transparency is not necessarily or broadly essential to the methods in certain aspects. In specific forms of my method where the blue transparency is used, it becomes one of the means of selectively exposing separate parts of the final negative exclusively to lights of the respective selected colors; but in other forms of the methods that selectivity may be achieved either in part or wholly by the use of other means as for instance suitable color filters.

The differentiating characteristic of the method to be described in this present application as compared with the methods described in said co-pending applications resides in the use of a photographic representation of one component, as for instance a film carrying an action image, and which is made to carry selective color filters. The selective action which finally exposes one part of the final negative to one component only and another part of the final negative to the other component only may then be reached in either of two typical manners, one of which involves the use of the blue transparency, the other involving selective (successive) use of printing lights of the two selected colors.

The specific methods illustrative of the present invention will be best understood from the following detailed description, reference for this purpose being had to the accompanying drawings, in which.

I shall first explain the nature of what I term the blue transparency, and what I term the action positive, then going on to an explanation of their use in my present methods.

Assuming that it is desired to compose a given action with a given background scene, an ordinary photograph, either a still photograph or a motion picture photograph, is taken of the background. From the negative thus obtained a positive is made upon a film or other transparency having a bichromated gelatin actinic layer, so as to get what is known as a bichromated gelatin image; and in printing this positive it is preferred to print through the celluloid or other base so that the outer face of the bichromated gelatin remains comparatively soft, to be dissolved away by a warm water wash and thus produce a gelatine relief, as is well known. This gelatine relief image is next dyed with a suitable dye. I have found that a mixture of napthol green and what is known as patent blue (alphazurine) is suitable for the purpose, obtaining a good clear blue color, rendering the blue gelatine image very transparent. The positive thus prepared is almost if not quite uniformly transparent to blue light over its whole surface. Viewed through red light the image immediately shows up substantially exactly as a corresponding black and white positive appears when viewed with red light. These effects are obtained because the blue transparency is of a somewhat "thin" and "light" blue color, passing some white light and passing more white light in the thin parts of the gelatin image than in the thick parts of the gelatin image. The opposite effects will be observed if the transparency be dyed red, as it may be with safranine. I find a red transparency to be as good as a blue one; but for sake of simplicity in description I shall assume the transparency to be blue.

I describe the blue transparency as a positive on the assumption that it is desired to produce a final composite negative. If it be desired to make a final composite positive, the blue transparency would of course then be a negative; and likewise what I describe here as the action positive would then be an action negative.

Figure 1:
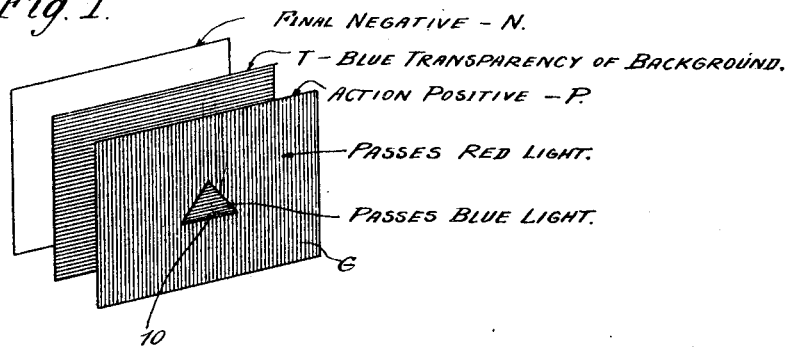
Fig. 1 is a diagrammatic perspective showing the arrangement of films or other photographic elements for carrying out one form of the method.

The action positive may preferably be produced by photographing the selected action, in this case, before a white background so as to obtain a negative with an opaque ground and a positive with a clear ground surrounding the action image. In Fig. 1 a simple indication of an action image is shown at 10 surrounded by a clear or transparent ground G. The action positive is designated generally by the letter P. This action positive is then treated in some suitable manner to dye the action image 10 substantially the same color as that of blue transparency T, and to dye the clear ground G in a color that has a minus relation to the blue color selected. For that purpose a red color like that of a Neon light may be used. Of course it is understood that if it were desired to make a single composite photograph of two still subjects of the positive P might easily be dyed or colored by hand; but in motion picture work such hand coloring is relatively impracticable and a method that will color the positive in these two differential colors is to be desired.

Such a method of coloring may typically be as follows: When the positive P is produced it is first developed and fixed in the usual way. It may then be bleached in a water solution of sodium chloride, potassium bichromate, and copper sulphate. The proportions may be: sodium chloride 13.22 grammes; potassium bichromate 0.5 grammes; copper sulphate 1.2 grammes; water 120 ccs. After the bleaching treatment the positive will then be fixed in plain hypo solution and dried. Then it will be immersed in a water solution of chromic chloride and potassium iodide (chromic chloride 1.0 gramme; potassium iodide 0.5 gramme; water 200 ccs.) and then passed through a dye bath of alphazurine (patent blue). The blue dye follows the image and dyes the gelatine of the image part a clear transparent blue. Next the film is dried and is then passed through a dye bath of safranine (anilin pink). This basic red dye is repelled by the blue dye previously applied and dyes only those portions unaffected by the blue dye. The result is that the action positive P has the gelatine of its action image dyed in a clear blue while all the surrounding ground is dyed in a clear transparent red. If a red transparency were used the color relations on the action positive would be reversed.

The result of the first bleaching of positive P is the production of insoluble silver chloride together with chromium compounds, as transformation products of the reduced metallic silver which has been the result of development of the positive. The chromium compounds have a tanning and hardening action on the gelatin immediately adjacent the silver. The subsequent fixing removes the silver chloride completely and leaves a chromium compound transparent image.

The subsequent subjection of the positive to the chromic chloride and potassium iodide solution is optional; but when it is used it has the effect of converting chromium compounds in the chromium iodide compounds and makes the image sharper. The acid dye takes only on the hardened portions of the gelatine; or if it takes on the softer portions it is easily washed out there. The result is a dye image in blue of substantially the same color as that of the blue transparency; but of what may be termed a deeper tone, so that substantially no white light, and therefore no red light, can pass through this blue image. The red basic dye will not take where the blue acid dye is present, and therefore acts only upon the softer or ground portions of the gelatine.

In the form of the method illustrated in Fig. 1 a print is now made through action positive P and blue transparency T onto the final negative N. This may be done either by contact printing or by any suitable form of projection printing; it only being requisite that the printing light shall pass through both the action positive and the blue transparency—that the action positive and blue transparency be in effect superposed in printing relation. White light, or any color or mixture of light that contains both the red and blue colors may be used for this printing operation. It is preferable, however, to use a light mixture containing no single color that can pass both the filters; and the simplest procedure is merely to use a mixture of blue and red lights. The blue light alone can pass through the action image 10; and that blue light passes on through blue transparency T just as if the blue transparency were simply a blue filter. If the blue transparency has not a sufficiently perfect uniformity of transparency, that lack may be corrected by superposing in registration with the blue transparency a corresponding negative gelatine relief transparency dyed in a yellow or yellowish color.

The passage of the blue light through the image portion 10 prints that image onto final negative N. On the other hand blue light cannot pass through the red ground G; only red light can pass through that ground. The red light that passes through the red ground does not pass through transparency T uniformly but, as I have said before, passes through that transparency just as if the transparency were an ordinary black and white positive. The result is that all the parts of the background shown on blue transparency T are printed directly onto final negative N, except those parts masked or blocked out by the blue dyed action image 10. The final result is a perfectly matched composite print onto final negative N. Relative intensities of the printings of the two components on the final negative may be controllably varied by varying the relative densities of the dyes used on positive P and transparency T, or may be controlled by regulating the proportionate amount of blue and red light in the printing light used.

Figure 2:
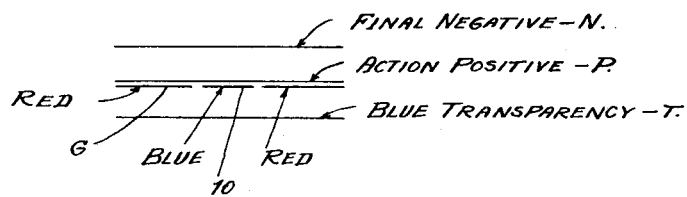
Fig. 2 is a diagram illustrating another arrangement for the same method.

It will be apparent that it makes no difference whether blue transparency T or action positive P is arranged next to negative N. Fig. 2 shows positive P between transparency T and negative N. The selective printing results are the same as before described.

Figure 3:
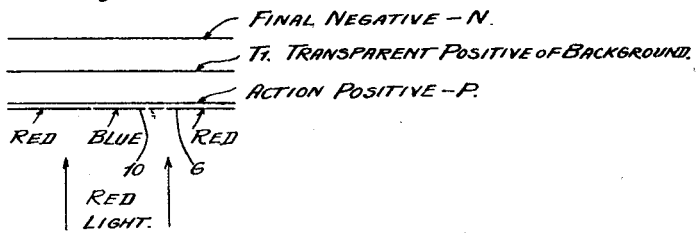
Figs. 3 and 4 are diagrams illustrating successive arrangements for carrying out another form of the method.
Figure 4:
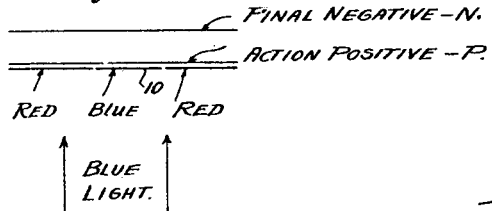

In the foregoing described methods it is the colors of positive P and transparency T that effect the selective printing of the desired component parts onto the final negative. In the method illustrated in Figs. 3 and 4 selectivity of printing is accomplished without the use of the blue transparency. In that case an ordinary black and white transparent positive T¹ is used, the action positive P being the same as before. With the action positive and transparency T¹ in superposed printing relation, the printing exposure is made on final negative N with red light only. The red light will pass only through the red ground G of positive P, being blocked out from image 10 by its blue dye. Consequently, in this exposure only the parts of the positive T¹ surrounding the position of action image 10 will be printed onto final negative N; that part of final negative N that corresponds to the position of the action image being left unexposed. Then after removing the positive T¹ another exposure is made with blue light alone, as shown in Fig. 4. This blue light is cut off by the red ground G and passes only through the blue dyed image 10, printing the image onto the final negative in the previously unexposed area. The final results are the same as before. The sequences of these two successive printings may of course be reversed if desired When I say that the first mentioned printing is accomplished with red light, it will be understood that any light containing red, or light that will pass the red filter, and not containing lights that will pass the blue filter, will suffice; and that in the second printing any light containing blue, or light that will pass the blue filter, but not containing light that will pass the red filter, will suffice.

And when I speak herein of photographic images (transparencies T and T¹ and positive P) it will be recognized that these images may be prepared in other manners, may even be prepared or made by hand.

I claim:

1. A method of producing a composite photograph embodying images of two components, that includes making on a limited area of a ground an image of one component, coloring the image area substantially uniformly in a selected color to transmit substantially only light of that selected color, and coloring the surrounding ground substantially uniformly in a color having a minus relation to the selected image color so that the ground will transmit predominately light of said last mentioned color, making an image of the other component, and selectively printing the two components onto different parts of a fresh actinic surface with printing lights of the two said colors.

2. A method of producing a composite photograph embodying images of two components, that includes making on a limited area of a transparent ground an image of one component, coloring the image area substantially uniformly in a selected transparent color to transmit substantially only light of that selected color, and coloring the surrounding ground substantially uniformly in a transparent color having a minus relation to the selected image color so that the ground will transmit predominantly light of said last mentioned color, making a transparent image of the other component and selectively printing through both the photographic images with lights of the two said colors onto different parts of a fresh actinic surface.

3. A method of producing a composite photograph embodying images of two components, that includes making on a limited area of a ground an image of one component, coloring the image area substantially uniformly in a selected color to transmit substantially only light of that selected color, and coloring the surrounding ground substantially uniformly in a color having a minus relation to the selected image color so that the ground will transmit predominantly light of said last mentioned color, making an image of the other component, placing both component images in superposed printing relation, printing from both of them in such superposed relation onto a fresh actinic surface with light of the second mentioned color, and printing from the colored component image only onto said fresh actinic surface with light of the first mentioned color.

4. A method of producing a composite photograph embodying images of two components, that includes making on a limited area of a transparent ground an image of one component, coloring the image area substantially uniformly in a selected transparent color to transmit substantially only light of that selected color, and coloring the surrounding ground substantially uniformly in a transparent color having a minus relation to the selected image color so that the ground will transmit predominantly light of said last mentioned color, making a transparent image of the other component, placing both component images in superposed printing relation, printing from both of them in such superposed relation onto a fresh actinic surface with light of the second mentioned color, and printing from the colored component image only onto said fresh actinic surface with light of the first mentioned color.

5. A method of producing a composite photograph embodying images of two components, that includes making on a limited area of a transparent ground an image of one component, coloring the image area substantially uniformly in a selected transparent color to transmit substantially only light of that selected color, and coloring the surrounding ground substantially uniformly in a transparent color having a minus relation to the selected image color so that the ground will transmit predominantly light of said last mentioned color, making a transparent color image of the other component in the color of the first mentioned image area, said color image being substantially uniformly transparent to light of its said color but variantly transparent to light of a relatively minus color, placing both component images in superposed printing relation, and printing through both images simultaneously onto a fresh actinic surface using light containing both said colors.

In witness that I claim the foregoing I have hereunto subscribed my name this 22 day of January 1927.

ROY J. POMEROY.